United States Patent
Nakao et al.

(10) Patent No.: US 11,859,676 B2
(45) Date of Patent: Jan. 2, 2024

(54) METHOD OF MANUFACTURING CONSTITUENT MEMBER OF CONSTANT-VELOCITY JOINT

(71) Applicant: JTEKT CORPORATION, Osaka (JP)

(72) Inventors: Motonori Nakao, Anjo (JP); Yohei Fukumoto, Nagoya (JP); Koji Hamajima, Chiryu (JP); Keiichi Kamata, Takahama (JP); Kenjiro Ikeda, Chita-gun (JP); Shintaro Yoshinaga, Yao (JP)

(73) Assignee: JTEKT CORPORATION, Kariya (JP)

( * ) Notice: Subject to any disclaimer, the term of this patent is extended or adjusted under 35 U.S.C. 154(b) by 813 days.

(21) Appl. No.: 16/713,090

(22) Filed: Dec. 13, 2019

(65) Prior Publication Data
US 2020/0200224 A1    Jun. 25, 2020

(30) Foreign Application Priority Data

Dec. 25, 2018 (JP) .................................. 2018-241873

(51) Int. Cl.
F16D 3/34    (2006.01)
(52) U.S. Cl.
CPC ........ *F16D 3/34* (2013.01); *F16D 2250/0046* (2013.01); *F16D 2250/0053* (2013.01)
(58) Field of Classification Search
CPC ........ F16C 33/64; F16C 2361/61; B21C 1/00; B21C 1/22; B21C 23/085; B21C 37/045;
(Continued)

(56) References Cited

U.S. PATENT DOCUMENTS 2,273,188 A * 2/1942 Graves .................... D01D 1/00
264/102
5,878,323 A * 3/1999 Sakai ...................... F16C 33/64
419/29
(Continued)

FOREIGN PATENT DOCUMENTS

DE    102017109889 A1 *  11/2017
EP        3156677 A1 *   4/2017
(Continued)

OTHER PUBLICATIONS

Office Action dated Dec. 13, 2022, in corresponding Japanese Patent Application No. 2018-241873 (with Partial English Translation), 8 pages.
(Continued)

*Primary Examiner* — Robert A. Siconolfi
*Assistant Examiner* — Mahbubur Rashid
(74) *Attorney, Agent, or Firm* — Oblon, McClelland, Maier & Neustadt, L.L.P.

(57) ABSTRACT

A method of manufacturing a constituent member of a constant-velocity joint includes: performing plastic working; and performing hardening of a material. The plastic working is performed with a material of the constituent member heated to a predetermined working temperature range. The hardening of the material is performed by utilizing heat applied for heating to the working temperature range in performing the plastic working as heat for the hardening of the material and cooling the material after performing the plastic working.

14 Claims, 9 Drawing Sheets

(58) Field of Classification Search
CPC ......... B21C 37/06; F01D 25/005; F16D 3/34; F16D 2250/0046; F16D 2250/0053
See application file for complete search history.

(56) References Cited

U.S. PATENT DOCUMENTS

| | | | | |
|---|---|---|---|---|
| 6,458,222 | B1 * | 10/2002 | Matsubara | C22F 1/08 148/681 |
| 6,463,830 | B1 * | 10/2002 | Ito | F16H 48/147 74/650 |
| 9,133,886 | B2 * | 9/2015 | Kohara | B22F 3/168 |
| 9,822,256 | B2 * | 11/2017 | Kim | C23C 14/48 |
| 9,856,906 | B2 * | 1/2018 | Yoshida | F16C 3/02 |
| 2007/0187004 | A1 * | 8/2007 | Hirai | B60B 27/0005 148/337 |
| 2010/0239202 | A1 * | 9/2010 | Kuroda | B60B 27/0005 384/589 |
| 2010/0323803 | A1 * | 12/2010 | Yoshida | C21D 1/06 464/139 |
| 2011/0048585 | A1 * | 3/2011 | Toki | C21D 1/18 148/320 |
| 2012/0211125 | A1 * | 8/2012 | Yoshida | F16D 3/2055 464/106 |
| 2015/0291801 | A1 * | 10/2015 | Kim | B05D 1/28 106/629 |
| 2016/0208353 | A1 * | 7/2016 | Hiraoka | C21D 9/40 |
| 2017/0219015 | A1 * | 8/2017 | Kamikawa | F16D 3/223 |
| 2019/0078623 | A1 * | 3/2019 | Cheng | F16D 3/2245 |
| 2019/0120297 | A1 * | 4/2019 | Cheng | F16D 3/223 |

FOREIGN PATENT DOCUMENTS

| | | | | |
|---|---|---|---|---|
| JP | 2005098449 | A | * | 4/2005 |
| JP | 2007-270345 | A | | 10/2007 |
| JP | 2008-231451 | A | | 10/2008 |
| JP | 2008304006 | A | * | 12/2008 |
| JP | 2010-280962 | A | | 12/2010 |
| JP | 2011-74421 | A | | 4/2011 |
| JP | 2012-67345 | A | | 4/2012 |
| JP | 2013-36339 | A | | 2/2013 |
| JP | 2013-76155 | A | | 4/2013 |
| JP | 5398965 | B2 | * | 1/2014 |
| JP | 2014-233782 | A | | 12/2014 |
| JP | 2018-90837 | A | | 6/2018 |
| WO | WO-2012039255 | A1 | * | 3/2012 |
| WO | WO 2017/195652 | A1 | | 11/2017 |

OTHER PUBLICATIONS

Japanese Office Action dated May 23, 2023 in Japanese Patent Application No. 2018-241873 (with partial English language translation), 8 pages.

* cited by examiner

METHOD OF MANUFACTURING CONSTITUENT MEMBER OF CONSTANT-VELOCITY JOINT

INCORPORATION BY REFERENCE

The disclosure of Japanese Patent Application No. 2018-241873 filed on Dec. 25, 2018 including the specification, drawings and abstract is incorporated herein by reference in its entirety.

BACKGROUND

1. Technical Field

The present disclosure relates to a method of manufacturing a constituent member of a constant-velocity joint.

2. Description of Related Art

A constant-velocity joint mounted on a vehicle includes, in the case where the constant-velocity joint is a ball-type joint, for example, an outside joint member in a bottomed tubular shape, an inside joint member disposed inside the outside joint member, a plurality of balls disposed between a plurality of outside ball grooves formed in the outside joint member and a plurality of inside ball grooves formed in the inside joint member, and a cage that holds the balls. The balls that are held by the cage are rollably supported by rolling surfaces of the outside ball grooves and rolling surfaces of the inside ball grooves, and transfer torque between the outside joint member and the inside joint member.

Japanese Unexamined Patent Application Publication No. 2007-270345 (JP 2007-270345 A) describes a method of manufacturing an outside joint member that is a constituent member of a constant-velocity joint. In the manufacturing method, a material to form the outside joint member is heated to a predetermined temperature to be subjected to plastic working. Then, the material is subjected to ironing, rough turning, form rolling, induction hardening, tempering, finish turning, painting, paint drying, etc. to form the final outside joint member.

SUMMARY

The method of manufacturing an outside joint member of a constant-velocity joint requires a total of four heating and cooling steps, that is, a heating and cooling step for plastic working, a heating and cooling step for hardening, a heating and cooling step for tempering, and a heating and cooling step for paint drying. Therefore, the cost of installation of heating equipment and the cost of energy consumed for heating may be high.

The present disclosure provides a low-cost method of manufacturing a constituent member of a constant-velocity joint.

A first aspect of the present disclosure provides a method of manufacturing a constituent member of a constant-velocity joint, including performing plastic working and performing hardening of a material. The plastic working is performed with a material of the constituent member heated to a predetermined working temperature range. The hardening of the material is performed by utilizing heat applied for heating to the working temperature range in performing the plastic working as heat for the hardening of the material and cooling the material after the plastic working.

With the method of manufacturing a constituent member of a constant-velocity joint according to the first aspect of the present disclosure, it is only necessary that the material should be subjected to a single heating and cooling step for plastic working and hardening, which can significantly suppress the cost of installation of heating equipment and the cost of energy consumed for heating.

The method of manufacturing a constituent member of a constant-velocity joint according to the first aspect of the present disclosure may further include applying a paint, drying the paint, and performing tempering of the material. The paint may be applied after performing the hardening. The paint on the material may be dried in a predetermined drying temperature range after applying the paint. The tempering of the material may be performed by utilizing heat applied for heating to the drying temperature range in the drying as heat for the tempering of the material and cooling the material.

The method of manufacturing a constituent member of a constant-velocity joint according to the first aspect of the present disclosure may further include performing finish turning of the material after performing the hardening and before applying the paint.

The method of manufacturing a constituent member of a constant-velocity joint according to the first aspect of the present disclosure may further include: performing tempering of the material after performing the hardening; and performing finish turning of the material after performing the tempering.

In the method of manufacturing a constituent member of a constant-velocity joint according to the first aspect of the present disclosure, a temperature of the material immediately after the plastic working is completed in performing the plastic working may be a temperature that is equal to or higher than a transformation point of the material.

The method of manufacturing a constituent member of a constant-velocity joint according to the first aspect of the present disclosure may further include heating the material in an inert gas atmosphere before performing the plastic working.

A second aspect of the present disclosure provides a method of manufacturing a constituent member of a constant-velocity joint, including: performing hardening of a material of the constituent member; applying a paint to the material; drying the paint; and performing tempering of the material. The paint is applied after performing the hardening. The paint on the material is dried in a predetermined drying temperature range after applying the paint. The tempering of the material is performed by utilizing heat applied for heating to the drying temperature range in the drying as heat for the tempering of the material and cooling the material.

With the method of manufacturing a constituent member of a constant-velocity joint according to the second aspect of the present disclosure, it is only necessary that the material should be subjected to a single heating and cooling step for paint drying and tempering, which can significantly suppress the cost of installation of heating equipment and the cost of energy consumed for heating.

The method of manufacturing a constituent member of a constant-velocity joint according to the first or second aspect of the present disclosure may further include removing scales of the material immediately after performing the hardening.

In the method of manufacturing a constituent member of a constant-velocity joint according to the first or second aspect of the present disclosure, the hardening may be performed with the material restrained in order to suppress deformation and distortion of the material due to the hardening.

The method of manufacturing a constituent member of a constant-velocity joint according to the first or second aspect of the present disclosure may further include correcting the material after performing the hardening in order to remove deformation and distortion of the material due to the hardening.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

1. Schematic Configuration of Constant-Velocity Joint

A schematic configuration of a constant-velocity joint applied to a manufacturing method according to an embodiment of the present disclosure will be described. The constant-velocity joint may be a variety of joints such as a ball-type joint and a tripod-type joint. Examples of the ball-type joint include a fixed ball-type constant-velocity joint (such as BJ and UFJ) and a sliding ball-type constant-velocity joint (such as DOJ and LJ).

Figure 1:
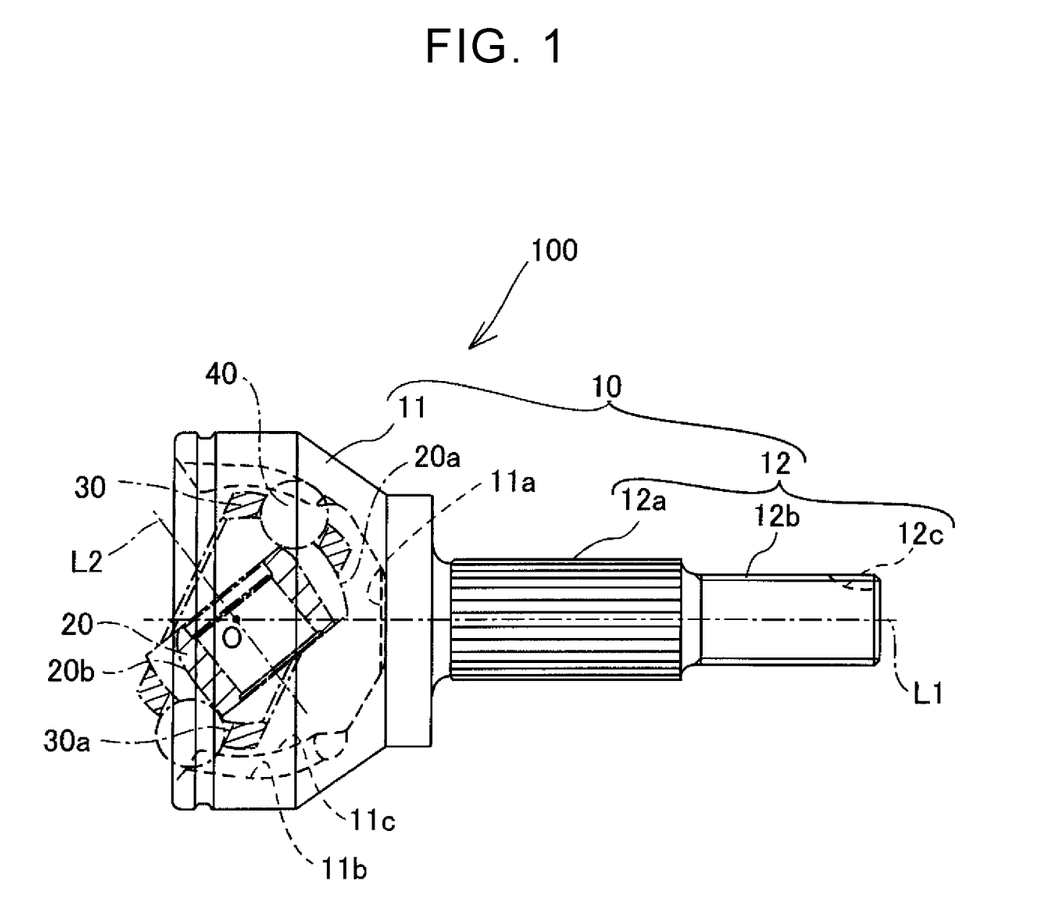
FIG. 1 illustrates an axial section of a constant-velocity joint applied to a manufacturing method according to an embodiment of the present disclosure.

The constant-velocity joint includes at least an outside joint member, an inside joint member, and rolling elements. Here, the fixed ball-type constant-velocity joint is taken as an example of the constant-velocity joint. Thus, as illustrated in FIG. 1, a constant-velocity joint 100 includes an outside joint member 10, an inside joint member 20, a cage 30, and six balls 40 that serve as rolling elements.

The constant-velocity joint 100 is a constant-velocity joint of a joint center fixed type and is mounted on a vehicle. The constant-velocity joint 100 is suitably used as an outboard joint for a drive shaft. The constituent member of the constant-velocity joint 100 to be applied to the manufacturing method according to the present embodiment is the outside joint member 10. Therefore, the inside joint member 20, the cage 30, and the balls 40 are indicated by hidden outlines (long dashed short dashed lines) in FIG. 1.

The outside joint member 10 has a cup portion 11 in a bottomed tubular shape that opens on one side (left side in FIG. 1) in the direction of a central axis L1, and a coupling shaft portion 12 formed integrally with the cup portion 11 to extend toward the other side (right side in FIG. 1) in the direction of the central axis L1. The cup portion 11 is formed with an outside ball groove portion 11b formed in an inner peripheral surface 11a of the cup portion 11. The inner peripheral surface 11a has a concave spherical shape. The outside ball groove portion 11b extends in the direction of the central axis L1. The coupling shaft portion 12 is formed with a spline portion 12a, a screw portion 12b, and an engagement groove portion 12c for connection to a different power transfer shaft (not illustrated).

The inside joint member 20 is formed in an annular shape, and formed with an inside ball groove portion 20b formed in an outer peripheral surface 20a of the inside joint member 20. The outer peripheral surface 20a has a convex spherical shape. The inside ball groove portion 20b extends in the direction of a central axis L2. The cage 30 is formed with a plurality of window portions 30a that can accommodate and hold one ball 40 each. The cage 30 is disposed between the inner peripheral surface 11a of the outside joint member 10 and the outer peripheral surface 20a of the inside joint member 20. The balls 40 that are held by the cage 30 are rollably disposed between the outside ball groove portion 11b and the inside ball groove portion 20b.

The inside joint member 20 is relatively rotated about a joint center O with respect to the outside joint member 10 while rolling the balls 40. That is, the inside joint member 20 can make an angle (joint angle) with respect to the outside joint member 10. The cage 30 is rotated about the joint center O along with rolling of the balls 40. The balls 40 that are held by the cage 30 transfer torque between the outside joint member 10 and the inside joint member 20.

2. Characteristics of Manufacture of Outside Joint Member

Figure 3:
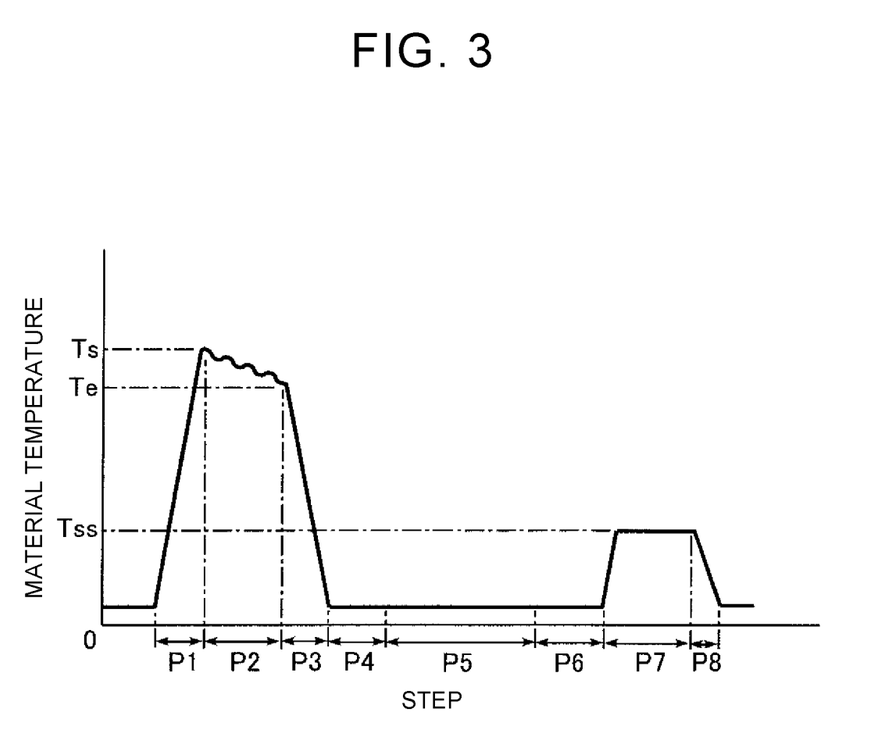
FIG. 3 illustrates the relationship between steps that constitute the first manufacturing method and the temperature of a material.

As illustrated in FIG. 3, a step of manufacturing the outside joint member 10 includes: a plastic working and hardening heating step (step P1 in FIG. 3) in which a material (hereinafter a material that has been processed etc. will also be referred to as the "material") to form the outside joint member 10 is heated for plastic working and hardening; a plastic working step (step P2 in FIG. 3) in which the material is subjected to plastic working; and a hardening cooling step (step P3 in FIG. 3) in which the material is cooled for hardening.

The manufacturing step further includes: a scale removal step (step P4 in FIG. 3) in which scales of the material are removed; a finish turning step (step P5 in FIG. 3) in which the material is subjected to finish turning; a paint step (step P6 in FIG. 3) in which a paint is applied to the material; a drying and tempering heating step (step P7 in FIG. 3) in which the material is heated for paint drying and tempering; and a tempering cooling step (step P8 in FIG. 3) in which the material is cooled for tempering.

As described in the Summary section, the manufacture of an outside joint member of a constant-velocity joint according to the related art requires the material to form the outside joint member to be subjected to a total of four heating and cooling steps, that is, a heating and cooling step for plastic working, a heating and cooling step for hardening, a heating and cooling step for tempering, and a heating and cooling step for paint drying.

In the manufacture of the outside joint member 10 of the constant-velocity joint 100 according to the present embodiment, hardening of the material is performed by utilizing heat applied to the material for heating to a working temperature range during plastic working as heat for hardening of the material and by cooling the material after plastic working (steps P1 and P3 in FIG. 3). Further, the material is tempered by utilizing heat applied to the material for heating to a drying temperature range during paint drying as heat for tempering of the material and by cooling the material (steps P7 and P8 in FIG. 3).

Consequently, it is only necessary that the material should be subjected to a total of two heating and cooling steps, that is, a heating and cooling step for plastic working and hardening and a heating and cooling step for paint drying and tempering, which can significantly suppress the cost of installation of heating equipment and the cost of energy consumed for heating. The characteristics of the manufacturing step will be described in detail below.

The outside joint member 10 according to the present embodiment is formed from a steel material (S55C) containing 0.40% to 0.60% of carbon, and the material after being hardened (after being cooled) is so hard as not to be easily turnable. Thus, main processing is completed in plastic working steps (four sets), specifically warm forging and warm ironing, which performed in a predetermined working temperature range before cooling. That is, in the warm forging, rough processing of the outer periphery of the cup portion 11 and the outer periphery of the coupling shaft portion 12 is completed. In the warm ironing, finishing of the inner peripheral surface 11a of the cup portion 11 and the spline portion 12a of the coupling shaft portion 12 and rough processing of the outside ball groove portion 11b are completed. While the spline portion 12a is formed through rough turning and form rolling in the related art, a rough turning step and a form rolling step can be omitted in the present embodiment.

The material is hardened by cooling the material immediately after the plastic working in the predetermined working temperature range described above is completed. If a hardening cooling start temperature (temperature immediately after the plastic working is completed) Te is too low, the hardening temperature may be insufficient. Further, it is necessary to avoid a transformation (a phenomenon in which the crystal structure is varied) of the steel material. From the above, the hardening cooling start temperature (temperature immediately after the plastic working is completed) Te is set to be at least equal to or higher than 727° C., which is the transformation point ($A_1$ point) of the steel material (equal to or higher than the transformation point), preferably a temperature that is equal to or higher than the $A_3$ line in the Fe—C binary equilibrium diagram. In the present example, the hardening cooling start temperature Te is set to 870° C. The hardening is through hardening in which water or oil is sprayed to the material that has been entirely heated to rapidly cool the material. Since the entire material is hardened, the strength of the material is improved better than the induction hardening process according to the related art in which the surface of the material is hardened. Hence, the functionality is improved when the outside joint members 10 of the same dimensions are formed, and a weight reduction is achieved when the outside joint members 10 of the same strength are formed.

On the other hand, a plastic working temperature becomes gradually lower in the plastic working step (particularly, heat is generated through deformation during each set, and cooled by air between the sets) from a plastic working start temperature Ts at the start of plastic working that uses heat applied before the plastic working (heat applied for hardening). Hence, it is necessary for the plastic working start temperature Ts that the hardening cooling start temperature Te should be secured after the plastic working time (in the present example, 40 sec.) elapses. It should be noted, however, that the organization may be coarsened if the temperature is too high. From the above, in the present example, the plastic working start temperature Ts is set to 900° C. or higher and 1050° C. or lower, preferably 950° C. or higher and 990° C. or lower. It is occasionally necessary to shorten the plastic working time in order to secure the temperature range in the plastic working step described above, depending on the size of the material etc.

If heating before plastic working (heating for hardening) is performed in an air atmosphere, surface decarburization in which carbon is removed from the surface of the material is caused. In the related art, a surface decarburized layer of the material is removed through rough turning after plastic working. In the warm forging according to the present embodiment, however, rough processing of the outer periphery of the cup portion 11 and the outer periphery of the coupling shaft portion 12 is performed, and thus no rough turning is necessary. Therefore, there is no chance to remove the surface decarburized layer from the material, and a forged skin due to the warm forging remains, as it is, as the product skin in the outside joint member 10. Thus, heating before plastic working is performed in a nitrogen gas atmosphere (inert gas atmosphere) to prevent surface decarburization of the material. Besides the nitrogen gas, an argon gas etc. may also be used as long as an inert gas.

In addition, scales adhere to the surface of the material because of oxidation during hardening of the material. Thus, the scales of the material are removed through shot blasting (that uses alumina particles etc.), shot peening, barrel processing, wet blasting, etc. immediately after the hardening. In addition, as described above, the outer periphery of the cup portion 11 and the outer periphery of the coupling shaft portion 12 are subjected to rough processing in the warm forging, and the outside ball groove portion 11b and an inside spherical surface portion 11c (see FIG. 1) are subjected to rough processing in the warm ironing. Hence, finish turning is performed on such rough processed portions. Further, the screw portion 12b and the engagement groove portion 12c of the coupling shaft portion 12 are also processed in the finish turning. While the screw portion 12b is formed through form rolling in the related art, a form rolling step can be omitted in the present embodiment.

In addition, the hardness of the material after tempering is lowered by about 50 Hv. Therefore, it is necessary that a tempering start temperature (paint drying start temperature) Tss for maintaining a predetermined hardness should be equal to or higher than 100° C. The paint that is used in the present embodiment is a water-soluble, highly rust-proof paint, and contains an epoxy resin material as a paint component. Therefore, the paint is burned to be powdery at a temperature exceeding 200° C. Meanwhile, an unpainted portion is oxidized to turn into a dark reddish-brown metal surface color at a temperature exceeding 200° C. From the above, the tempering start temperature (paint drying start temperature) Tss is set to be equal to or higher than 150° C. and equal to or lower than 200° C.

3. Method of Manufacturing Constituent Member of Constant-Velocity Joint

Next, a method of manufacturing the outside joint member 10 of the constant-velocity joint 100 according to the embodiment of the present disclosure will be described with reference to the drawings. As described above, the method of manufacturing the outside joint member 10 includes heating a material for plastic working and hardening, and cooling the material for the hardening. The method further includes heating the material for paint drying and tempering, and cooling the material for the tempering.

It should be noted, however, that different manufacturing methods are also conceivable, such as a manufacturing method that includes heating a material for plastic working and hardening but does not include heating the material for paint drying and tempering, and a manufacturing method that includes heating a material for paint drying and tempering but does not include heating the material for plastic working and hardening. With such methods, it is also possible to decrease the number of heating and cooling steps, which can significantly suppress the cost of installation of heating equipment and the cost of energy consumed for heating. Such methods will be sequentially described below.

First of all, a first manufacturing method will be described. In the first manufacturing method, first, a material to form the outside joint member 10 is caused to pass through a forging Billet heater filled with a nitrogen gas, and heated until the temperature of the material reaches the plastic working start temperature (step S1 in FIG. 2; P1 in FIG. 3; plastic working and hardening heating step). Then, the material that has been heated is set to a pressing machine to perform rough processing of the outer periphery of the cup portion 11 and the outer periphery of the coupling shaft portion 12 through warm forging that is plastic working, and perform finishing of the inner peripheral surface 11a of the cup portion and the spline portion 12a of the coupling shaft portion 12 and rough processing of the outside ball groove portion 11b and the inside spherical surface portion 11c through warm ironing that is plastic working (step S2 in FIG. 2; P2 in FIG. 3; plastic working step).

Subsequently, water or oil is sprayed to the material that has been subjected to plastic working to rapidly cool the material to harden the material (step S3 in FIG. 2; P3 in FIG. 3; hardening cooling step). When the temperature of the material is lowered to room temperature (step S4 in FIG. 2; P3 in FIG. 3; hardening cooling step), scales of the material are removed (step S5 in FIG. 2; P4 in FIG. 3; scale removal step). Then, the material, from which scales have been removed, is set to a turning device to be subjected to finish turning of the outer periphery of the cup portion 11, the outer periphery of the coupling shaft portion 12, the outside ball groove portion 11b, and the inside spherical surface portion 11c and finish turning of the screw portion 12b and the engagement groove portion 12c of the coupling shaft portion 12 (step S6 in FIG. 2; P5 in FIG. 3; finish turning step).

Figure 2:
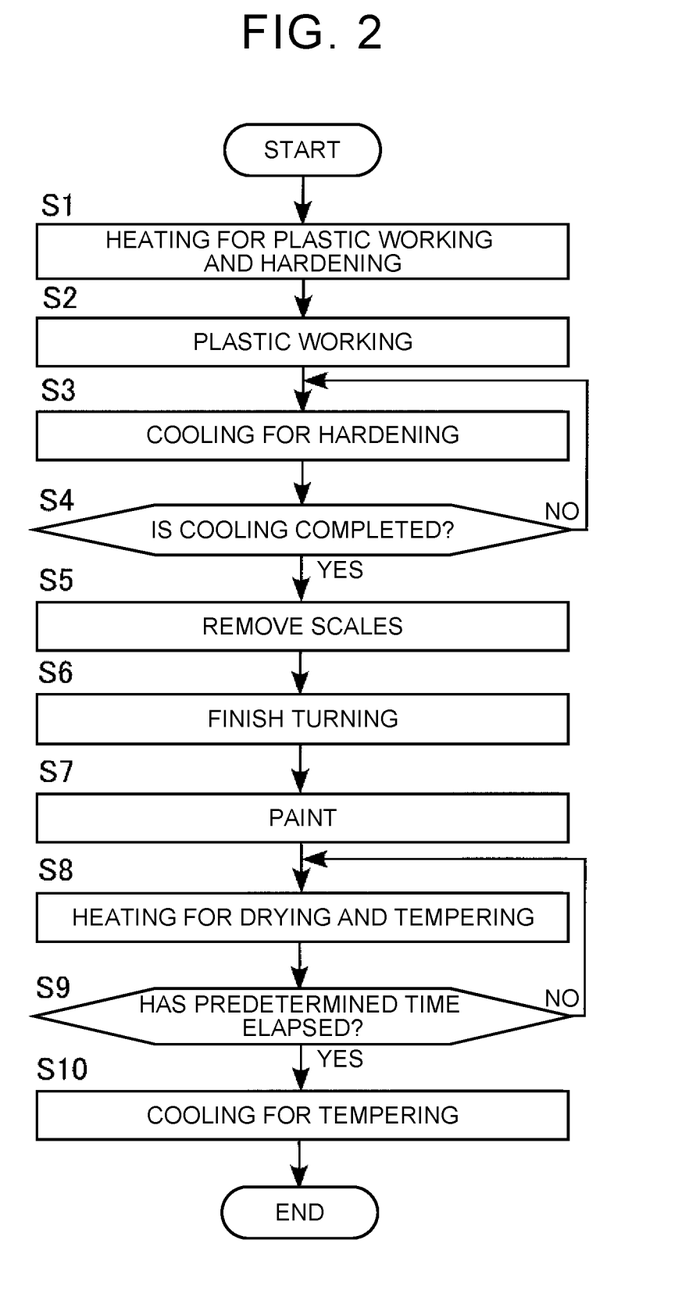
FIG. 2 is a flowchart illustrating a first method of manufacturing a constituent member of the constant-velocity joint.

Next, the material that has been subjected to turning is caused to pass through a painting machine to be painted (step S7 in FIG. 2; P6 in FIG. 3; paint step). Subsequently, the material is caused to pass through a drying machine to heat the material until the temperature of the material reaches the tempering start temperature and dry the paint of the material (step S8 in FIG. 2; P7 in FIG. 3; drying and tempering heating step). Then, when the paint of the material is dried and a predetermined tempering time has elapsed since the temperature of the material reaches the tempering start temperature (step S9 in FIG. 2; P7 in FIG. 3; drying and tempering heating step), the material is taken out of the drying machine to be cooled (step S10 in FIG. 2; P8 in FIG. 3; tempering cooling step), finishing all the processes.

The first manufacturing method includes heating a material for plastic working and hardening, and cooling the material for the hardening. The method further includes heating the material for paint drying and tempering, and cooling the material for the tempering. Consequently, it is only necessary that the material should be subjected to a total of two heating and cooling steps, that is, a heating and cooling step for plastic working and hardening and a heating and cooling step for paint drying and tempering, which can significantly suppress the cost of installation of heating equipment and the cost of energy consumed for heating.

Next, a second manufacturing method will be described. The second manufacturing method is the same as the first manufacturing method in the plastic working and hardening heating step, the plastic working step, the hardening cooling step, and the scale removal step (steps S11 to S15 in FIG. 4; P1 to P4 in FIG. 5). Then, the material, from which scales have been removed, is caused to pass through a heating furnace to be heated until the temperature of the material reaches the tempering start temperature (step S16 in FIG. 4; P71 in FIG. 5; tempering heating step). Then, when a predetermined tempering time has elapsed since the temperature of the material reaches the tempering start temperature (step S17 in FIG. 4; P71 in FIG. 5; tempering heating step), the material is taken out of the heating furnace to be cooled (step S18 in FIG. 4; P81 in FIG. 5; tempering cooling step).

Figure 4:
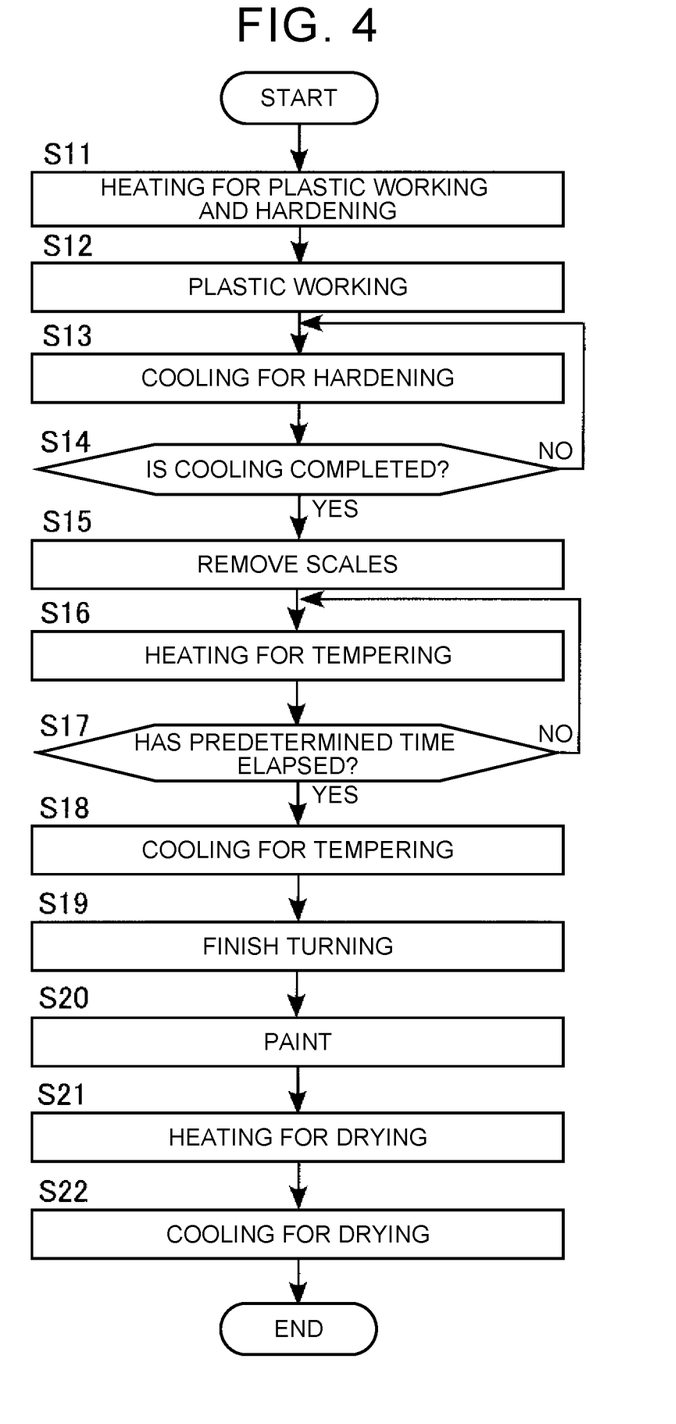
FIG. 4 is a flowchart illustrating a second method of manufacturing the constituent member of the constant-velocity joint.
Figure 5:
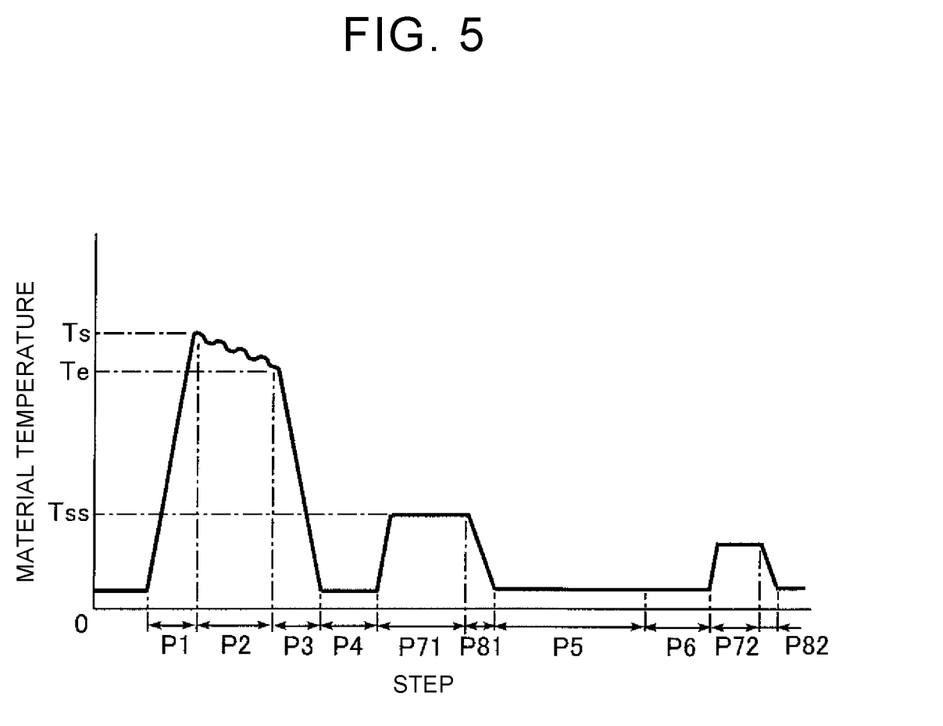
FIG. 5 illustrates the relationship between steps that constitute the second manufacturing method and the temperature of the material.

Then, the material that has been cooled is set to a turning device to be subjected to finish turning of the outer periphery of the cup portion 11, the outer periphery of the coupling shaft portion 12, the outside ball groove portion 11b, and the inside spherical surface portion 11c and finish turning of the screw portion 12b and the engagement groove portion 12c of the coupling shaft portion 12 (step S19 in FIG. 4; P5 in FIG. 5; finish turning step). At this time, finish turning can be performed easily since the material has been tempered and the hardness thereof has been lowered. Then, the material that has been subjected to turning is caused to pass through a painting machine to be painted (step S20 in FIG. 4; P6 in FIG. 5; paint step). Subsequently, the material is caused to pass through a drying machine to dry the paint (step S21 in FIG. 4; P72 in FIG. 5; drying step), and the material is taken out of the drying machine to be cooled (step S22 in FIG. 4; P82 in FIG. 5), finishing all the processes.

The second manufacturing method includes heating a material for plastic working and hardening, and cooling the material for the hardening. Consequently, it is only necessary that the material should be subjected to a total of three heating and cooling steps, that is, a heating and cooling step for plastic working and hardening, a heating and cooling step for paint drying, and a heating and cooling step for tempering, which can significantly suppress the cost of installation of heating equipment and the cost of energy consumed for heating.

Next, a third manufacturing method will be described. The third manufacturing method is the same as the first manufacturing method in the plastic working and hardening heating step, the plastic working step, the hardening cooling step, the scale removal step, the finish turning step, and the paint step (steps S31 to S37 in FIG. 6; P1 to P6 in FIG. 7). Then, the material that has been painted is caused to pass through a drying machine to dry the paint (step S38 in FIG.

6; P72 in FIG. 7; drying step), and the material is taken out of the drying machine to be cooled (step S39 in FIG. 6; P82 in FIG. 7).

Figure 6:
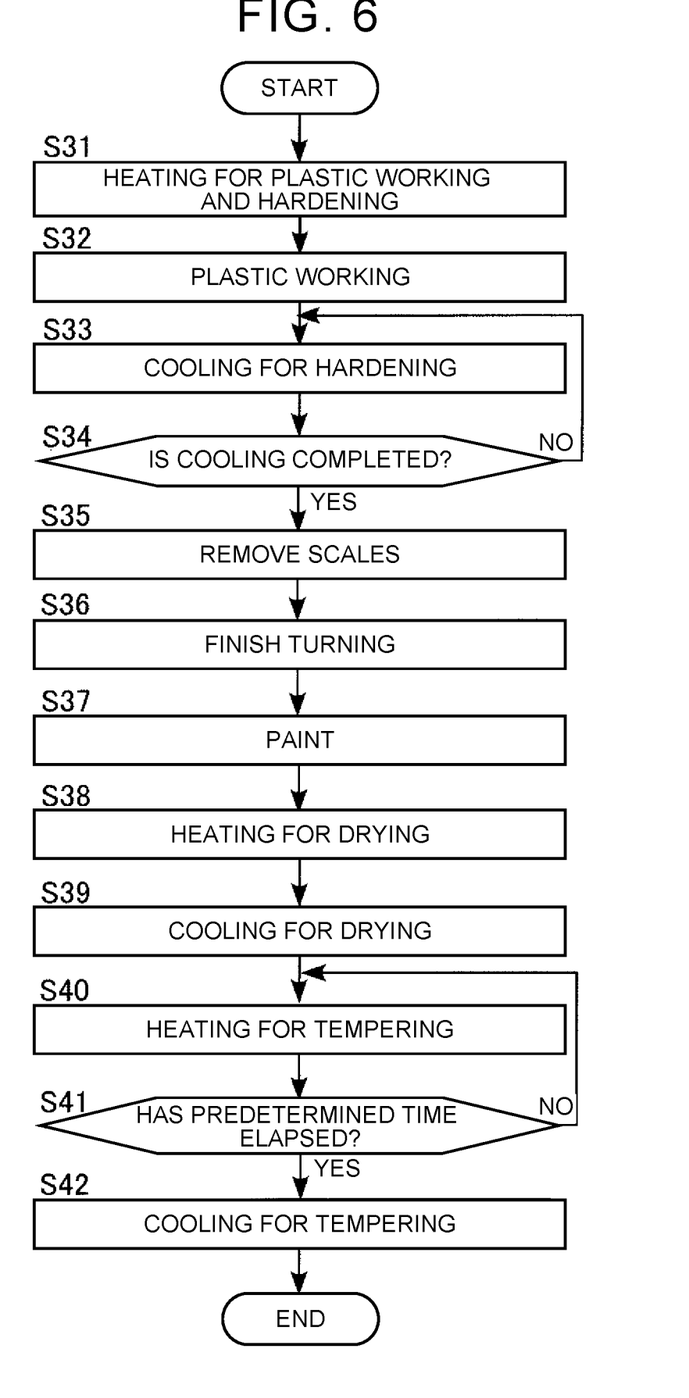
FIG. 6 is a flowchart illustrating a third method of manufacturing the constituent member of the constant-velocity joint.
Figure 7:
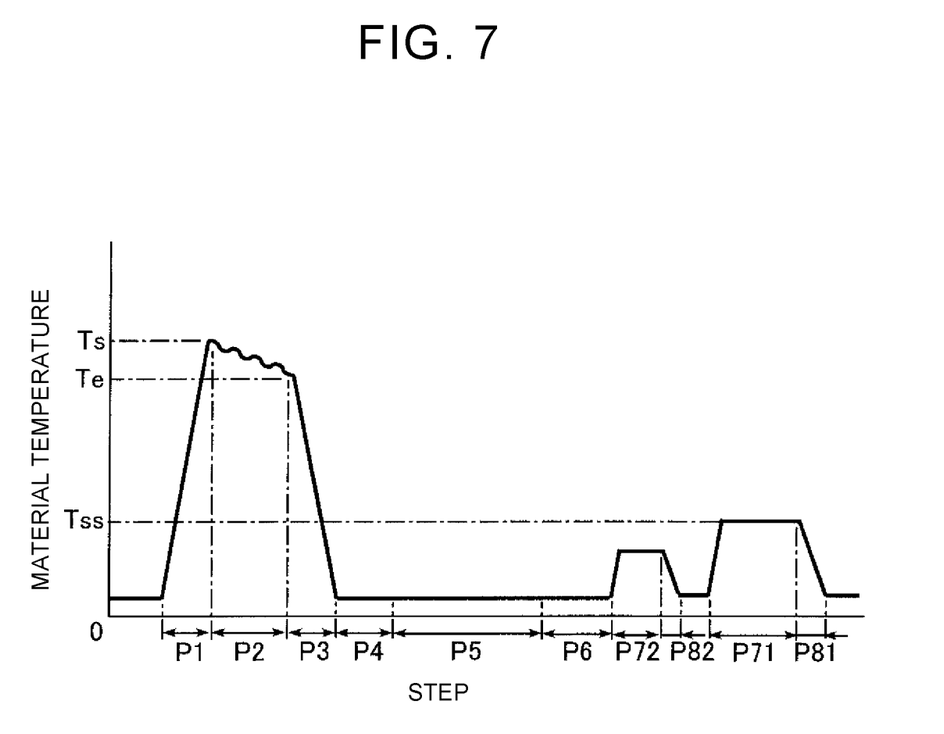
FIG. 7 illustrates the relationship between steps that constitute the third manufacturing method and the temperature of the material.

Then, the material that has been cooled is caused to pass through a heating furnace to be heated until the temperature of the material reaches the tempering start temperature (step S40 in FIG. 6; P71 in FIG. 7; tempering heating step). Then, when a predetermined tempering time has elapsed since the temperature of the material reaches the tempering start temperature (step S41 in FIG. 6; P71 in FIG. 7; tempering heating step), the material is taken out of the heating furnace to be cooled (step S42 in FIG. 6; P81 in FIG. 7; tempering cooling step), finishing all the processes.

The third manufacturing method includes heating a material for plastic working and hardening, and cooling the material for the hardening. Consequently, it is only necessary that the material should be subjected to a total of three heating and cooling steps, that is, a heating and cooling step for plastic working and hardening, a heating and cooling step for paint drying, and a heating and cooling step for tempering, which can significantly suppress the cost of installation of heating equipment and the cost of energy consumed for heating.

Next, a fourth manufacturing method will be described. The fourth manufacturing method does not include heating for hardening, but includes heating for plastic working and cooling after the plastic working (steps S51 to S53 in FIG. 8; P11, P21, and P31 in FIG. 9; plastic working heating step, plastic working step, plastic working cooling step). Then, the material that has been cooled to room temperature is caused to pass through a heating furnace to be heated until the temperature of the material reaches the hardening start temperature (step S54 in FIG. 8; P12 and P22 in FIG. 9; hardening heating step).

Figure 8:
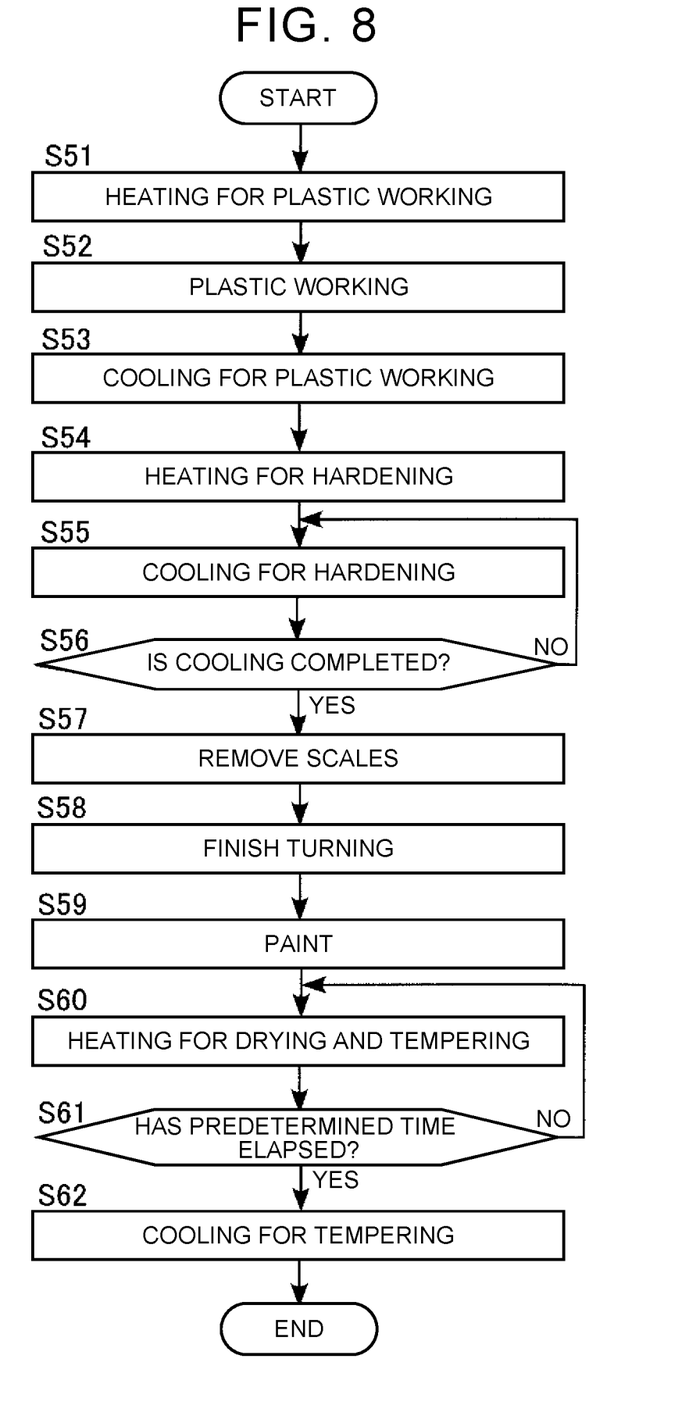
FIG. 8 is a flowchart illustrating a fourth method of manufacturing the constituent member of the constant-velocity joint.
Figure 9:
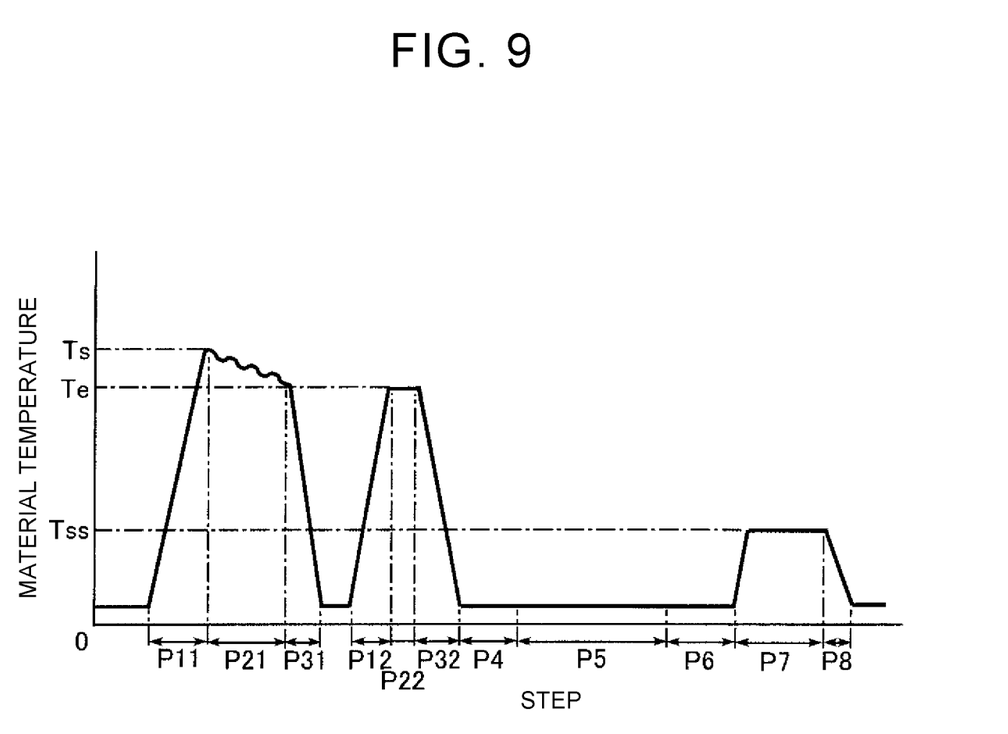
FIG. 9 illustrates the relationship between steps that constitute the fourth manufacturing method and the temperature of the material.

When the temperature of the material reaches the hardening start temperature, water or oil is sprayed to the material to rapidly cool the material to harden the material (step S55 in FIG. 8; P32 in FIG. 9; hardening cooling step). Then, after the temperature of the material is lowered to room temperature (step S56 in FIG. 8; P32 in FIG. 9; hardening cooling step), the scale removal step, the finish turning step, the paint step, the drying and tempering heating step, and the tempering cooling step of the first manufacturing method are performed (steps S57 to S62 in FIG. 8; P4 to P8 in FIG. 9), finishing all the processes.

The fourth manufacturing method includes heating a material for paint (e.g. water-soluble paint) drying and tempering, and cooling the material for the tempering. Consequently, it is only necessary that the material should be subjected to a total of three heating and cooling steps, that is, a heating and cooling step for plastic working, a heating and cooling step for hardening, and a heating and cooling step for paint drying and tempering, which can significantly suppress the cost of installation of heating equipment and the cost of energy consumed for heating.

4. Others

The method of manufacturing the outside joint member 10 of the constant-velocity joint 100 according to the embodiment described above is described as including removing scales of the material and finish turning. However, one or both of the scale removal step and the finish turning step may not be included in the case where no scales adhere to the material during hardening of the material or in the case where a high working precision can be obtained with plastic working. The outside joint member 10 is described as an example of a constituent member of the constant-velocity joint 100. However, the present disclosure is also applicable to other constituent members.

In the case where the material is deformed or distorted in the hardening step, hardening may be performed with the material restrained in a die etc. in order to suppress deformation or distortion of the material. In order to remove deformation or distortion of the material due to the hardening step, the material may be corrected by a pressing machine etc. after the hardening step.

What is claimed is:

1. A method of manufacturing a constituent member of a constant-velocity joint, comprising:
    heating a temperature of a material of the constituent member to a plastic working start temperature;
    performing plastic working on the material of the constituent member while the temperature of the constituent member decreases such that the temperature of the constituent member is at a hardening cooling start temperature immediately after the plastic working is completed; and
    performing hardening of the material by cooling the material from the hardening cooling start temperature after performing the plastic working,
    wherein the plastic working start temperature is between 900° C. and 1050° C., and
    wherein the hardening cooling start temperature is greater than or equal to a transformation point of the material of the constituent member.

2. The method of manufacturing a constituent member of a constant-velocity joint according to claim 1, further comprising:
    applying a paint to the material after performing the hardening;
    drying the paint on the material in a predetermined drying temperature range after applying the paint; and
    performing tempering of the material by utilizing heat applied for heating to the drying temperature range in the drying as heat for the tempering of the material and by cooling the material.

3. The method of manufacturing a constituent member of a constant-velocity joint according to claim 2, further comprising
    performing turning of the material after performing the hardening and before applying the paint.

4. The method of manufacturing a constituent member of a constant-velocity joint according to claim 1, further comprising:
    performing tempering of the material after performing the hardening; and
    performing turning of the material after performing the tempering.

5. The method of manufacturing a constituent member of a constant-velocity joint according to claim 1, wherein the heating the temperature of the constituent member to the plastic working start temperature is performed in an inert gas atmosphere.

6. The method of manufacturing a constituent member of a constant-velocity joint according to claim 1, further comprising
    removing scales of the material immediately after performing the hardening.

7. The method of manufacturing a constituent member of a constant-velocity joint according to claim 1, wherein the hardening is performed with the material restrained so as to suppress deformation and distortion of the material due to the hardening.

8. The method of manufacturing a constituent member of a constant-velocity joint according to claim 1, further comprising
correcting the material after performing the hardening so as to remove deformation and distortion of the material due to the hardening.

9. The method of manufacturing a constituent member of a constant-velocity joint according to claim 1, wherein the performing plastic working on the material of the constituent member includes rough processing of an outer periphery of a cup portion and an outer periphery of a coupling shaft portion through warm forging, and finishing of an inner peripheral surface of the cup portion and a spline portion of the coupling shaft portion and rough processing of an outside ball groove portion and an inside spherical surface portion through warm ironing.

10. A method of manufacturing a constituent member of a constant-velocity joint, comprising:
heating a temperature of a material of the constituent member to a plastic working start temperature;
performing plastic working on the material of the constituent member while the temperature of the constituent member decreases from the plastic working start temperature such that the temperature of the constituent member is greater than or equal to a transformation point of the material of the constituent member immediately after the plastic working is completed;
cooling the material of the constituent member to room temperature after the plastic working is completed;
performing hardening of the material of the constituent member by heating the material of the constituent member to a hardening start temperature and then cooling the material of the constituent member to room temperature;
applying a paint to the material after performing the hardening;
heating the material to a predetermined drying temperature after applying the paint to dry the paint; and
performing tempering of the material by keeping the material at the drying temperature for a predetermined tempering time and then cooling the material,
wherein the hardening cooling start temperature is greater than or equal to the transformation point of the material of the constituent member.

11. The method of manufacturing a constituent member of a constant-velocity joint according to claim 10, further comprising
removing scales of the material immediately after performing the hardening.

12. The method of manufacturing a constituent member of a constant-velocity joint according to claim 11, further comprising
correcting the material after performing the hardening so as to remove deformation and distortion of the material due to the hardening.

13. The method of manufacturing a constituent member of a constant-velocity joint according to claim 10, wherein the hardening is performed with the material restrained so as to suppress deformation and distortion of the material due to the hardening.

14. The method of manufacturing a constituent member of a constant-velocity joint according to claim 10, wherein the predetermined drying temperature is between 150° C. and 200° C.

* * * * *